United States Patent
Kuo

(10) Patent No.: US 8,212,503 B2
(45) Date of Patent: Jul. 3, 2012

(54) DRIVING CIRCUIT FOR VOICE COIL MOTOR AND METHOD THEREOF

(75) Inventor: Fu-Rung Kuo, Taipei (TW)

(73) Assignee: Princeton Technology Corporation, Taipei County (TW)

( * ) Notice: Subject to any disclaimer, the term of this patent is extended or adjusted under 35 U.S.C. 154(b) by 422 days.

(21) Appl. No.: 12/651,077

(22) Filed: Dec. 31, 2009

(65) Prior Publication Data

US 2010/0164413 A1 Jul. 1, 2010

(30) Foreign Application Priority Data

Dec. 31, 2008 (TW) .................. 97151740 A

(51) Int. Cl.
| | |
|---|---|
| H02P 7/00 | (2006.01) |
| H02P 1/04 | (2006.01) |
| G05B 11/01 | (2006.01) |
| G05B 13/00 | (2006.01) |
| G05B 1/02 | (2006.01) |
| G05B 21/02 | (2006.01) |
| G11B 19/00 | (2006.01) |
| G11B 5/596 | (2006.01) |

(52) U.S. Cl. .................. 318/135; 318/400.09; 318/560; 318/561; 318/608; 318/636; 369/47.36; 369/47.41; 360/67; 360/71; 360/77.02; 360/78.04

(58) Field of Classification Search .................. 318/135, 318/400.09, 560, 561, 608, 636; 369/47.36, 369/47.41; 360/67, 71, 77.02, 78.04
See application file for complete search history.

(56) References Cited

U.S. PATENT DOCUMENTS

| | | | | |
|---|---|---|---|---|
| 5,130,583 A * | 7/1992 | Andoh | ........................ | 310/12.19 |
| 5,596,558 A * | 1/1997 | Arataki et al. | ............. | 369/53.18 |
| 6,304,200 B1 * | 10/2001 | Masuda | ........................ | 341/144 |
| 6,618,333 B1 * | 9/2003 | Chou et al. | ................. | 369/47.36 |
| 6,643,090 B1 * | 11/2003 | Pruett | ........................ | 360/78.04 |
| 2009/0174066 A1 * | 7/2009 | Yokoo | ........................ | 257/723 |
| 2010/0079174 A1 * | 4/2010 | Tsai et al. | ..................... | 327/105 |

* cited by examiner

*Primary Examiner* — Bentsu Ro
*Assistant Examiner* — Gabriel Agared
(74) *Attorney, Agent, or Firm* — Muncy, Geissler, Olds & Lowe, PLLC

(57) ABSTRACT

The invention provides a driving circuit for a voice coil motor. In one embodiment, the driving circuit includes a logic circuit, a digital-to-analog converter, and an output circuit. The logic circuit generates a series of samples of a digital output signal according to a digital input signal, wherein the samples of the digital output signal sequentially alter from a first input value of the digital input value to a second input value of the digital input signal according to an alteration pattern determined by a mode selection signal. The digital-to-analog converter converts the digital output signal to an analog output signal. The output circuit generates a driving current signal according to the analog output signal for driving the voice coil motor.

20 Claims, 8 Drawing Sheets

| S3 | S2 | S1 | S0 | Transition time ||
|----|----|----|----|--------|------|
|    |    |    |    | Single | Full |
| 0 | 0 | 0 | 0 | --     | 15μs     |
| 0 | 0 | 0 | 1 | 50μs   | 51.5ms   |
| 0 | 0 | 1 | 0 | 100μs  | 102.3ms  |
| 0 | 0 | 1 | 1 | 200μs  | 204.6ms  |
| 0 | 1 | 0 | 0 | 400μs  | 409.2ms  |
| 0 | 1 | 0 | 1 | 800μs  | 818.4ms  |
| 0 | 1 | 1 | 0 | 1600μs | 1636.8ms |
| 0 | 1 | 1 | 1 | 3200μs | 3273.6ms |

FIG. 5

DRIVING CIRCUIT FOR VOICE COIL MOTOR AND METHOD THEREOF

CROSS REFERENCE TO RELATED APPLICATIONS

This application claims priority of Taiwan Patent Application No. 097151740, filed on Dec. 31, 2008, the entirety of which is incorporated by reference herein.

BACKGROUND OF THE INVENTION

1. Field of the Invention

The invention relates to voice coil motors, and more particularly to driving circuits for voice coil motors.

2. Description of the Related Art

A voice coil motor is a linear DC motor and comprises a permanent magnet and a coil surrounding the permanent magnet. Generally, radio receiver loudspeakers have voice coil motors therein. Presently, voice coil motors are applied as actuators for servo control. For example, a voice coil motor is used as a driving motor for moving a pickup head of an optical disk drive. A voice coil motor generates a force in proportion to a current flowing through the coil of the voice coil motor. The voice coil motor therefore requires a driving circuit to generate a precise driving current to drive the voice coil motor to generate a precise moving force.

When a driving circuit generates a driving current to drive a voice coil motor, the driving current may jitter. Jittering of the driving current generates imprecise driving forces and lowers performance of voice coil motors. To prevent the driving signal of the voice coil motor from jittering, a conventional driving circuit usually comprises a complex component circuit to reduce jittering thereof. However, the component circuit comprises a plurality of diodes and a plurality of rectifying semiconductor elements, which increases manufacturing costs of the driving circuit. In another embodiment, a microcontroller or a digital signal processor is used to reduce uttering of the driving signal. The microcontroller or the digital signal processor, however, also increases manufacturing costs of the driving circuit. Thus, a driving circuit, manufactured at a low cost, with reduced jitter to drive a voice coil motor is called for.

BRIEF SUMMARY OF THE INVENTION

The invention provides a driving circuit for a voice coil motor. In one embodiment, the driving circuit includes a clock generator, a logic circuit, a digital-to-analog converter, and an output circuit. The clock generator generates a control clock signal according to a mode selection signal, wherein the frequency of the control clock signal is determined by the mode selection signal. The logic circuit generates a series of samples of a digital output signal according to a digital input signal, wherein the samples of the digital output signal sequentially alter from a first input value of the digital input value to a second input value of the digital input signal according to an alteration pattern determined by the mode selection signal, and the logic circuit outputs one of the samples in response to each clock cycle of the control clock signal. The digital-to-analog converter converts the digital output signal to an analog output signal. The output circuit generates a driving currant signal according to the analog output signal for driving the voice coil motor.

The invention provides a method for driving a voice coil motor. First, a target control mode is selected from a plurality of control modes according to a mode selection signal. A series of samples of a digital output signal are generated according to a digital input signal, wherein the samples of the digital output signal sequentially alter from a first input value of the digital input value to a second input value of the digital input signal according to an alteration pattern determined by the target control mode. The digital output signal is then converted into an analog output signal. A driving currant signal is then generated according to the analog output signal to drive the voice coil motor.

The invention provides a driving circuit for a voice coil motor. In one embodiment, the driving circuit comprises a logic circuit, a digital-to-analog converter, and an output circuit. The logic circuit generates a series of samples of a digital output signal according to a digital input signal, wherein the samples of the digital output signal sequentially alter from a first input value of the digital input value to a second input value of the digital input signal according to an alteration pattern determined by a mode selection signal. The digital-to-analog converter converts the digital output signal to an analog output signal. The output circuit generates a driving current signal according to the analog output signal for driving the voice coil motor.

A detailed description is given in the following embodiments with reference to the accompanying drawings.

BRIEF DESCRIPTION OF THE DRAWINGS

The invention can be more fully understood by reading the subsequent detailed description and examples with references made to the accompanying drawings, wherein:

FIG. 5 shows an embodiment of a clock cycle of a control clock signal CCLK determined by different values of a mode selection signal;

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
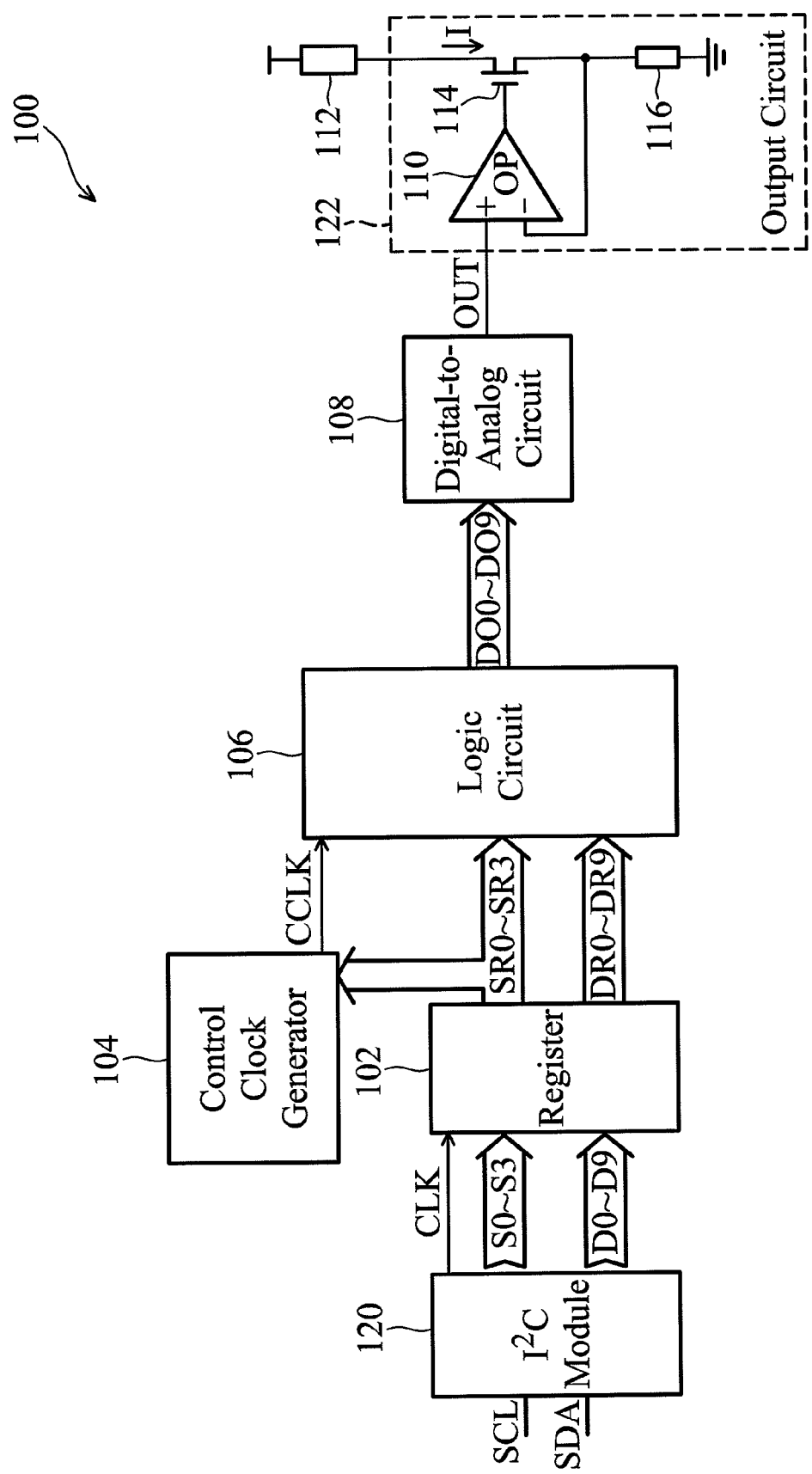
FIG. 1 is a block diagram of a driving circuit for a voice coil motor according to the invention.

Referring to FIG. 1, a block diagram of a driving circuit 100 for a voice coil motor according to the invention is shown. The driving circuit 100 generates a driving current I to drive a voice coil motor 112. The driving circuit 100 can control alteration timings and levels of the driving current I, thus preventing the driving current I from jittering. The voice coil motor 112 is therefore driven to generate a force with precision, thus improving system performance.

In one embodiment, the driving circuit 100 comprises an I²C module 120, a register 102, a control clock generator 104, a logic circuit 106, a digital-to-analog converter 108, and an output circuit 122. The I²C module 120 receives a digital serial signal SDA according to a clock signal SCL, and converts the digital serial signal SDA to a mode selection signal S0~S3 and a digital input signal D0~D9. The mode selection signal S0~S3 comprises a plurality of selection bits S0, S1, S2, and S3 for informing the control clock generator 104 and the logic circuit 106 of a target control mode. The digital input signal D0~D9 comprises a plurality of datastreams D0, D1, D2, ..., D8, and D9 for informing the driving circuit 100 of the level of the driving current, wherein the datastream D9 indicates most significant bits (MSB) and the datastream D0 indicates least significant bits (LSB).

Figure 2:
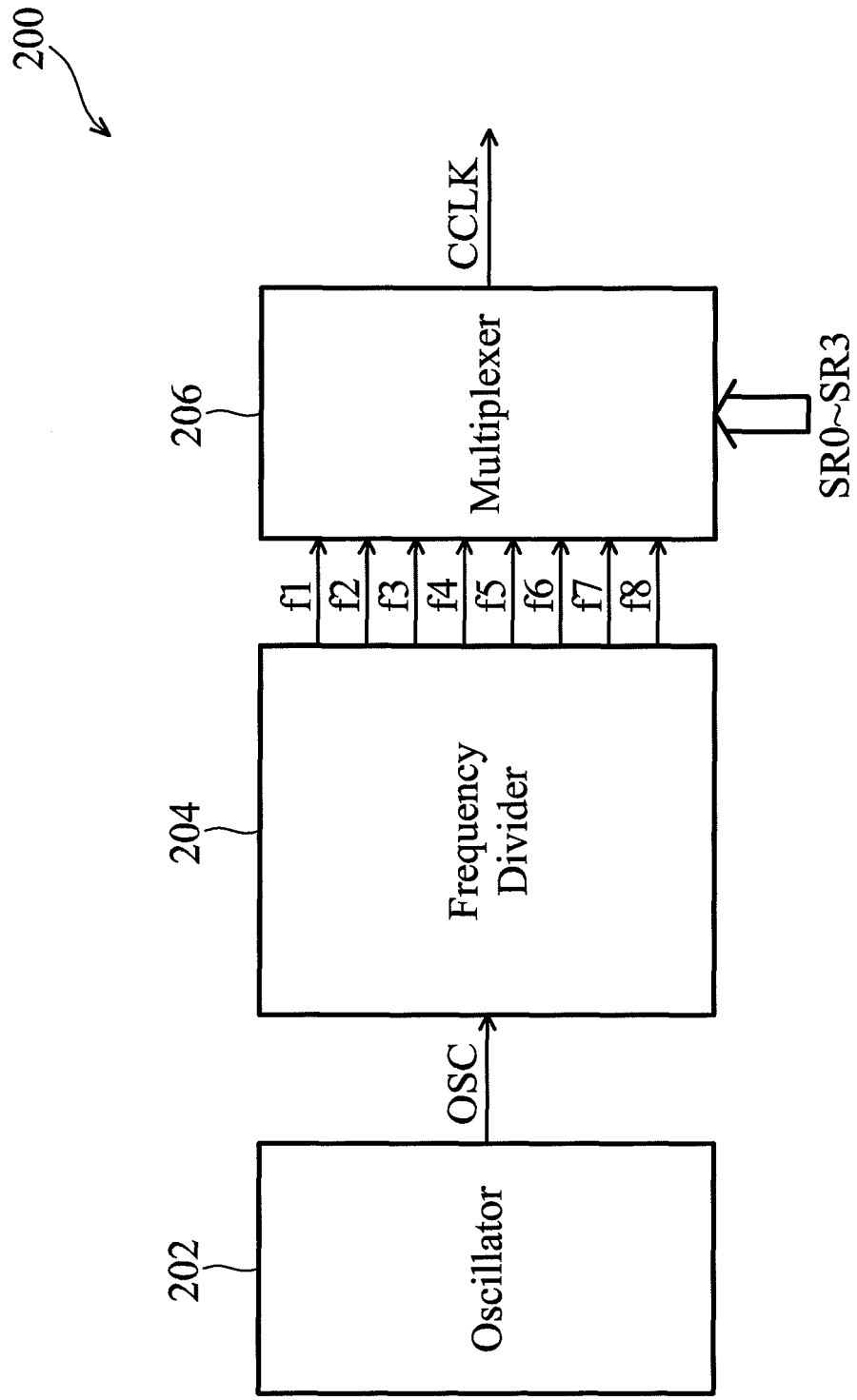
FIG. 2 is a block diagram of a control clock generator according to the invention.

The register 102 is coupled between the I²C module 120, the control clock generator 104, and the logic circuit 106. The register 102 buffers the mode selection signal S0~S3 and the digital input signal D0~D9, and outputs the mode selection signal S0~S3 and the digital input signal D0~D9 as the mode selection signal SR0~SR3 and the digital input signal DR0~DR9 sent to the control clock generator 104 and the logic circuit 106. The control clock generator 104 generates a control clock signal CCLK sent to the logic circuit 106 according to the mode selection signal SR0~SR3, wherein the frequency of the control clock signal CCLK is determined by the mode selection signal SR0~SR3. A detailed structure of the control clock signal 104 is shown in FIG. 2.

After the logic circuit 106 receives the mode selection signal SR0~SR3, the logic circuit 106 selects a target control mode from a plurality of control modes according to the mode selection signal SR0~SR3, wherein the target control mode determines an altering pattern of a digital output signal DO0~DO9. Selection of the target control mode according to the mode selection signal SR0~SR3 is further illustrated with FIG. 3. The logic circuit 106 then generates a series of samples of the digital output signal DO0~DO9, wherein the samples of the digital output signal DO0~DO9 alters from a first sample of the digital input signal DR0~DR9 to a second sample of the digital input signal DR0~DR9 according to the altering pattern determined by the target control mode, and the first sample and the second sample are two successive samples of the digital input signal DR0~DR9. Detailed steps for generating the samples of the digital output signal DO0~DO9 are illustrated with FIGS. 4A, 4B, and 4C.

The digital-to-analog converter 108 then converts the digital output signal DO0~DO9 generated by the logic circuit 106 to an analog output signal OUT. In one embodiment, the analog output signal OUT is determined according to the following algorithm:

$$OUT=(DO9\times2^9+DO8\times2^8+DO7\times2^7+DO6\times2^6+DO5\times2^5+DO4\times2^4+DO3\times2^3+DO2\times2^2+DO1\times2^1+DO0\times2^0)\times LSB,$$

wherein LSB is the value of the bitstream DO0 of the digital output signal.

The output circuit 120 then generates a driving current signal I according to the analog output signal OUT to drive the voice coil motor 112. In one embodiment, the output circuit 120 comprises an operational amplifier 110, a transistor 114, and a resistor 116. The operational amplifier 110 has a positive input terminal for receiving the analog output signal OUT, an output terminal coupled to the gate of the transistor 114, and a negative input terminal coupled to the source of the transistor 114. The resistor 116 is coupled between a source of the transistor 114 and a ground. The drain of the transistor 114 outputs a driving current signal I to the voice coil motor 112 to drive the voice coil motor to generate a force. Because the driving current signal I is converted from the analog output signal OUT, and the analog output signal OUT has a level precisely controlled by the digital output signal DO0~DO9, the driving current signal I therefore does not jitter, thus improving the performance of the voice coil motor 112.

Referring to FIG. 2, a block diagram of a control clock generator 200 according to the invention is shown. In one embodiment, the control clock generator 200 comprises an oscillator 202, a frequency divider 204, and a multiplexer 206. The oscillator 202 generates a high-frequency oscillating signal OSC. The frequency divider 204 then generate a plurality of clock signals f1, f2, ..., f8 with different frequencies according to the high-frequency oscillating signal OSC. The multiplexer 206 then selects a control clock signal CCLK from the clock signals f1, f2, ..., f8 according to the mode selection signal SR0~SR3, and outputs the control clock signal CCLK to the logic circuit 106. In one embodiment, the logic circuit 106 generates a sample of the digital output signal DO0~DO9 in response to each clock cycle of the control clock signal CCLK. Because the clock signals f1, f2, ..., f8 have different frequencies, the multiplexer 206 determines a clock signal suitable for the target control mode determined by the mode selection signal SR0~SR3 as the control clock signal CCLK sent to the logic circuit 106. The logic circuit 106 can then operate according to the control clock signal CCLK to output samples of the digital output signal DO0~DO9.

Figure 3:
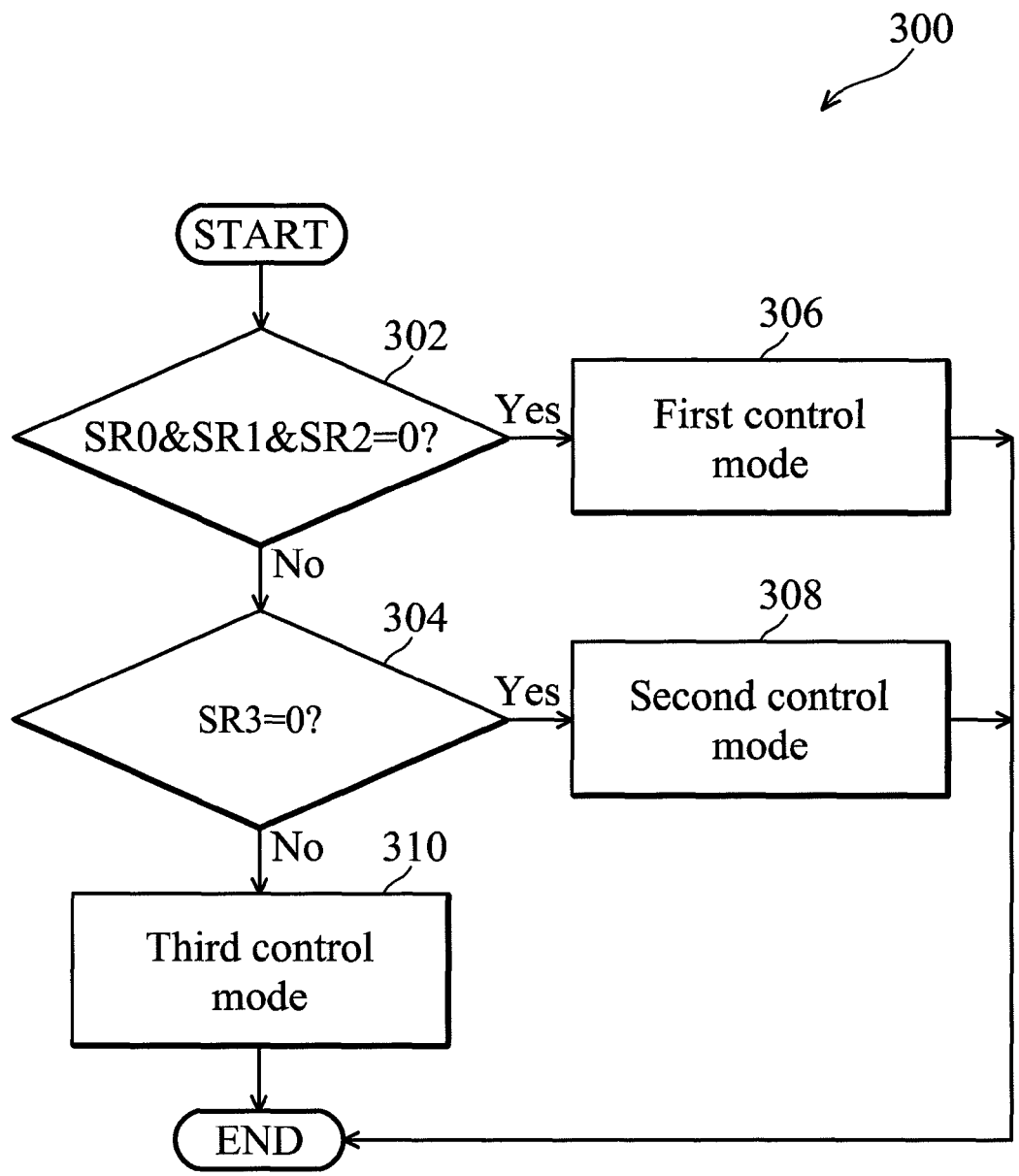
FIG. 3 is a flowchart of a method for determining a target control mode according to a mode selection signal according to the invention.

Referring to FIG. 3, a flowchart of a method 300 for determining a target control mode according to a mode selection signal SR0~SR3 according to the invention is shown. The logic circuit 106 is assumed to have three control modes including a first control mode, a second control mode, and a third control mode. The operations of the logic circuit 106 under the first control mode, the second control mode, and the third control mode are respectively shown in FIGS. 4A, 4B, and 4C. First, when the mode selection bits SR0, SR1, and SR2 are all equal to zero (step 302), the logic circuit 106 generates the samples of the digital output signal DO0~DO9 according to the first control mode (step 306). When the mode selection bit SR3 is equal to zero (step 304), the logic circuit 106 generates the samples of the digital output signal DO0~DO9 according to the second control mode (step 308). Otherwise, when the mode selection bits SR0, SR1, and SR2 are not all equal to zero, and the mode selection bit SR3 is not equal to zero, the logic circuit 106 generates the samples of the digital output signal DO0~DO9 according to the third control mode (step 310).

Figure 4A:
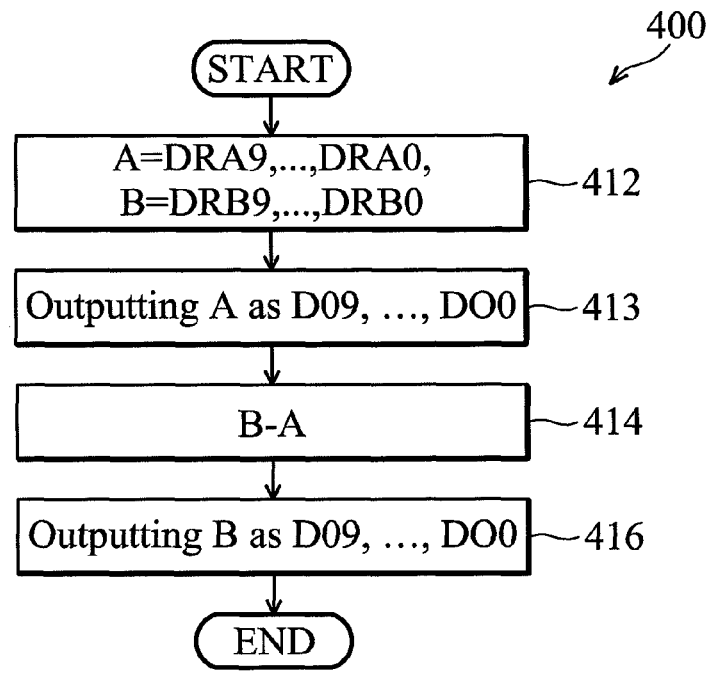
FIG. 4A is a flowchart of a method for operating a logic circuit under a first control mode according to the invention.

Referring to FIG. 4A, a flowchart of a method 400 for operating the logic circuit 106 under a first control mode according to the invention is shown. When the target control mode is the first control mode, the logic circuit 106 generates two samples DRA0~DRA9 and DRB0~DRB9 as the samples of the digital output signal DO0~DO9. The logic circuit 106 comprises a register storing values of two parameters A and B. The logic circuit 106 first sets the parameter A to a first sample value DRA0~DRA9 of the digital input signal, and sets the parameter B to a second sample value DRB0~DRB9 of the digital input signal (step 412). The logic circuit 106 then outputs values of the parameter A as the digital output signal DO0~DO9 (step 413), and a first sample value of the digital output signal DO0~DO9 is therefore equal to the first sample value DRA0~DRA9 of the digital input signal DR0~DR9. The logic circuit 106 then subtracts the parameter value A from the parameter value B (step 414). The logic circuit 106 then outputs values of the parameter B as the digital output signal DO0~DO9 (step 416), and a second sample value of the digital output signal DO0~DO9 is therefore equal to the second sample value DRB0~DRB9 of the digital input signal DR0~DR9. According to the first control mode, the logic circuit 106 therefore only outputs two samples to the digital-to-analog converter 108, and the digital-to-analog converter 108 only generates the analog output signal OUT with two voltage levels. The output circuit 122 then gradually adjusts the driving current I from the first sample value DRA0~DRA9 to the second sample value DRB0~DRB9.

Figure 4B:
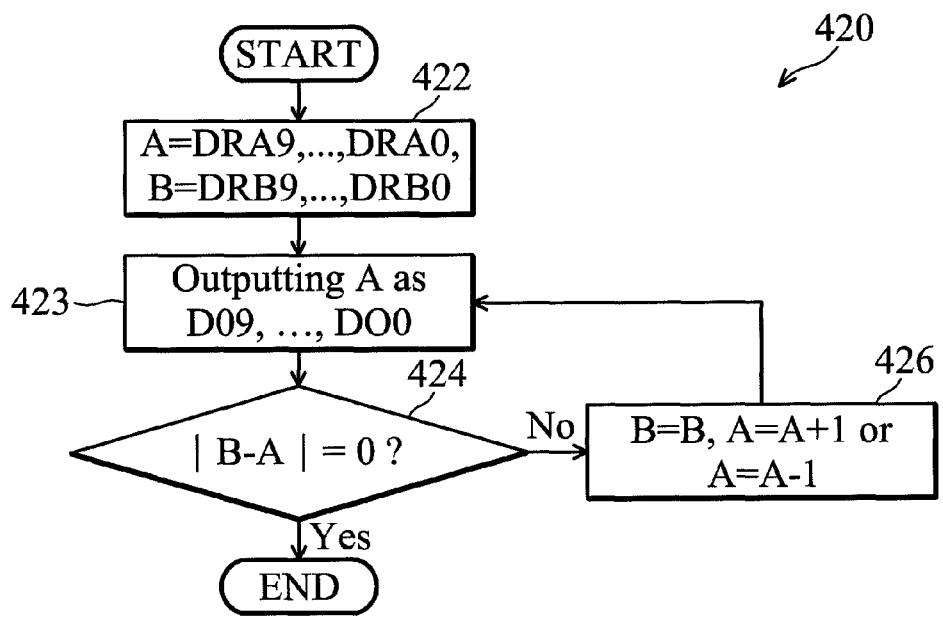
FIG. 4B is a flowchart of a method for operating a logic circuit under a second control mode according to the invention.

Referring to FIG. 4B, a flowchart of a method 420 for operating the logic circuit 106 under a second control mode according to the invention is shown. When the target control mode is the second control mode, the logic circuit 106 generates a series of samples gradually incremented or decremented by one from the first sample value DRA0~DRA9 to the second sample value DRB0~DRB9 of the digital input signal DR0~DR9 as the samples of the digital output signal DO0~DO9. The logic circuit 106 comprises a register storing values of two parameters A and B. The logic circuit 106 first sets the parameter A to a first sample value DRA0~DRA9 of the digital input signal, and sets the parameter B to a second sample value DRB0~DRB9 of the digital input signal (step 422). The logic circuit 106 then outputs values of the parameter A as the digital output signal DO0~DO9 (step 423), and a first sample value of the digital output signal DO0~DO9 is therefore equal to the first sample value DRA0~DRA9 of the digital input signal DR0~DR9. The logic circuit 106 then determines whether the parameter value B is equal to the parameter value A (step 424). If the parameter value B is greater than the parameter value A, the logic circuit 106 increments the parameter value A by one (step 426), and outputs values of the parameter A as the digital output signal DO0~DO9 (step 423). If the parameter value B is less than the parameter value A, the logic circuit 106 decrements the parameter value A by one (step 426), and outputs values of the parameter A as the digital output signal DO0~DO9 (step 423).

Thus, when the parameter value B is greater than the parameter value A, the logic circuit 106 calculates the samples of the digital output signal DO0~DO9 according to an increasing pattern. When the parameter value B is less than the parameter value A, the logic circuit 106 calculates the samples of the digital output signal DO0~DO9 according to a decreasing pattern. The loop of steps 426, 423 and 424 are continued until the parameter value A is equal to the parameter value B at step 424, and the logic circuit 106 generates a sample of the digital output signal DO0~DO9 in each loop. According to the second control mode, the logic circuit 106 therefore outputs a series of samples gradually incremented or decremented by one from the first sample value DRA0~DRA9 to the second sample value DRB0~DRB9 of the digital input signal DR0~DR9 as the samples of the digital output signal DO0~DO9. After the digital-to-analog converter 108 converts the samples of the digital output signal DO0~DO9 to the analog output signal OUT, the output circuit 122 then gradually adjusts the driving current I from the first sample value DRA0~DRA9 to the second sample value DRB0~DRB9.

Figure 4C:
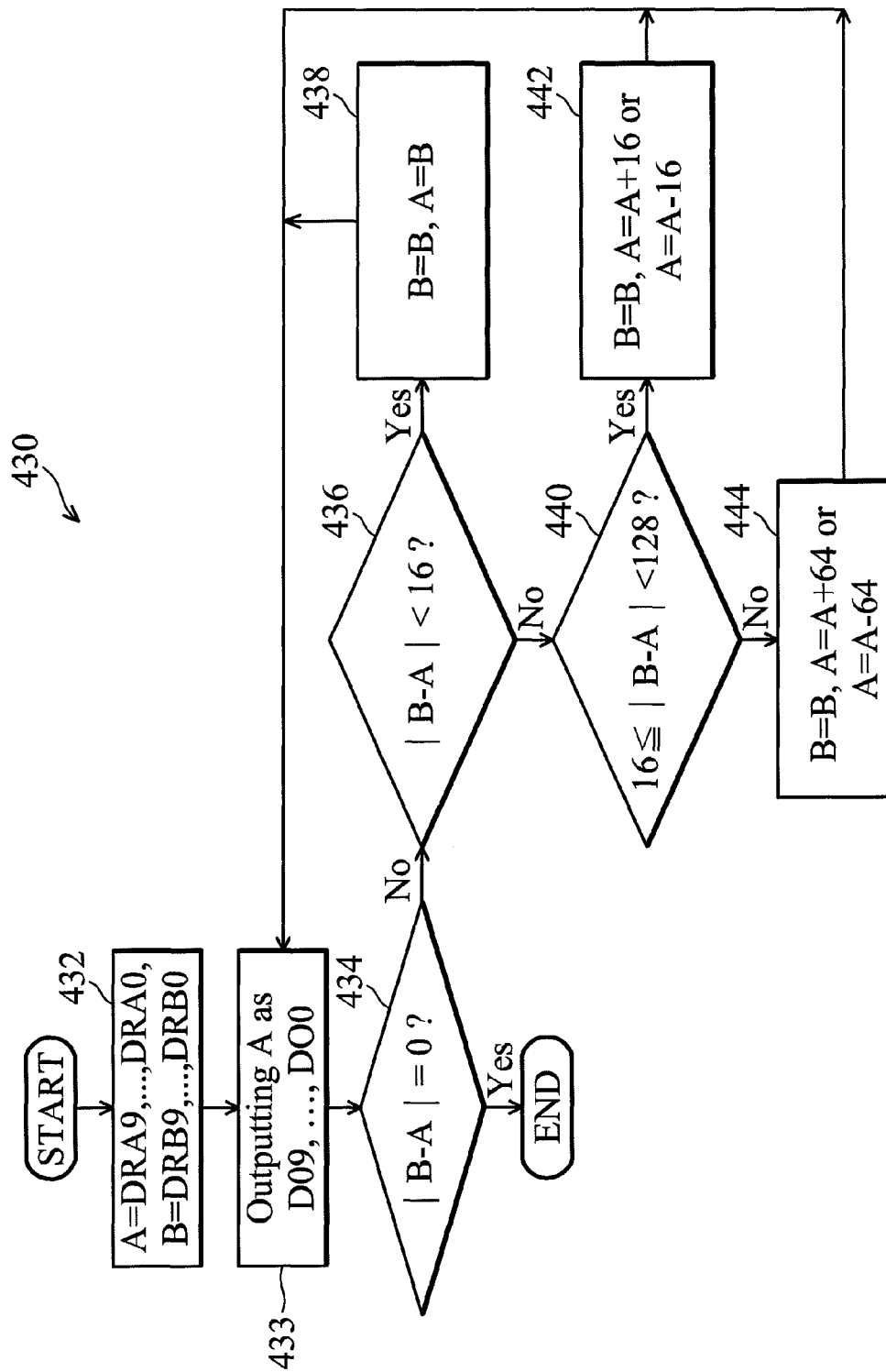
FIG. 4C is a flowchart of a method for operating a logic circuit under a third control mode according to the invention.

Referring to FIG. 4C, a flowchart of a method 430 for operating the logic circuit 106 under a third control mode according to the invention is shown. When the target control mode is the third control mode, the logic circuit 106 generates a series of samples gradually increased or decreased by $2^n$ from the first sample value DRA0~DRA9 to the second sample value DRB0~DRB9 of the digital input signal DR0~DR9 as the samples of the digital output signal DO0~DO9, wherein n is a gradually decreasing natural number. The logic circuit 106 comprises a register storing values of two parameters A and B. The logic circuit 106 first sets the parameter A to a first sample value DRA0~DRA9 of the digital input signal, and sets the parameter B to a second sample value DRB0~DRB9 of the digital input signal (step 432). The logic circuit 106 then outputs values of the parameter A as the digital output signal DO0~DO9 (step 433), and a first sample value of the digital output signal DO0~DO9 is therefore equal to the first sample value DRA0~DRA9 of the digital input signal DR0~DR9. The logic circuit 106 then determines whether the parameter value B is equal to the parameter value A (step 434). If the parameter value B is greater or less than the parameter value A by 16 (step 436), the logic circuit 106 sets the parameter value A to the parameter value B (step 438), and outputs values of the parameter A as the digital output signal DO0~DO9 (step 433). If the difference between the parameter value B and the parameter value A is greater than 16 and less than 128 (step 436), the logic circuit 106 increases or decreases the parameter value A by 16 (step 442), and outputs values of the parameter A as the digital output signal DO0~DO9 (step 433). If the difference between the parameter value B and the parameter value A is greater than 128 (step 436), the logic circuit 106 increases or decreases the parameter value A by 64 (step 444), and outputs values of the parameter A as the digital output signal DO0~DO9 (step 433).

Thus, when the parameter value B is greater than the parameter value A, the logic circuit 106 calculates the samples of the digital output signal DO0~DO9 according to an increasing pattern. When the parameter value B is less than the parameter value A, the logic circuit 106 calculates the samples of the digital output signal DO0~DO9 according to a decreasing pattern. According to the third control mode, the logic circuit 106 therefore outputs a series of samples gradually increased or decreased by $2^n$ from the first sample value DRA0~DRA9 to the second sample value DRB0~DRB9 of the digital input signal DR0~DR9 as the samples of the digital output signal DO0~DO9. After the digital-to-analog converter 108 converts the samples of the digital output signal DO0~DO9 to the analog output signal OUT, the output circuit 122 then gradually adjusts the driving current I from the first sample value DRA0~DRA9 to the second sample value DRB0~DRB9.

Referring to FIG. 5, an embodiment of a clock cycle of a control clock signal CCLK determined by different values of a mode selection signal S0~S3 is shown. Because the mode selection signal comprises four mode selection bits S0, S1, S2, and S3, the control clock signal CCLK can have 16 different the clock cycles in length. In the embodiment, there are eight different clock cycles in length. The transition time corresponding to a single mode indicates a period for the logic circuit 106 to output a sample of the digital output signal DO0~DO9, and the transition time corresponding to a full mode indicates a period for the logic circuit 106 to output a series of samples of the digital output signal DO0~DO9 between two samples of the digital input signal DR0~DR9.

Figure 6:
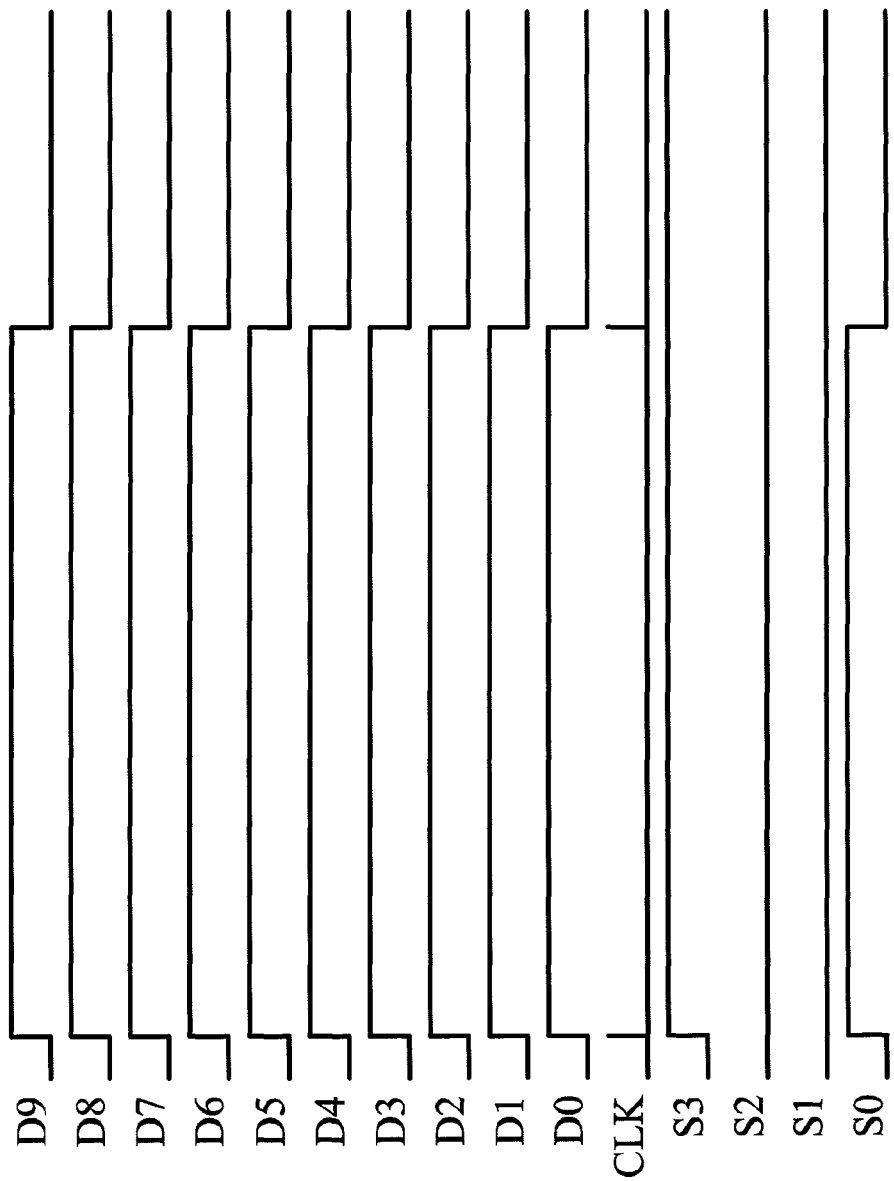
FIG. 6 is a schematic diagram of an embodiment of input signals of a driving circuit for a voice coil motor according to the invention.
Figure 7A:
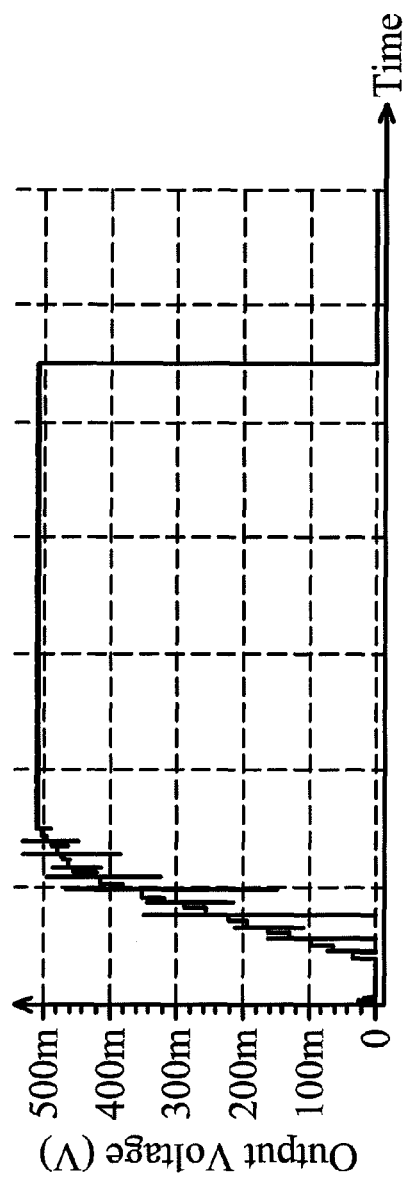
FIG. 7A is a schematic diagram of an analog output signal generated according to the input signals shown in FIG. 6.
Figure 7B:
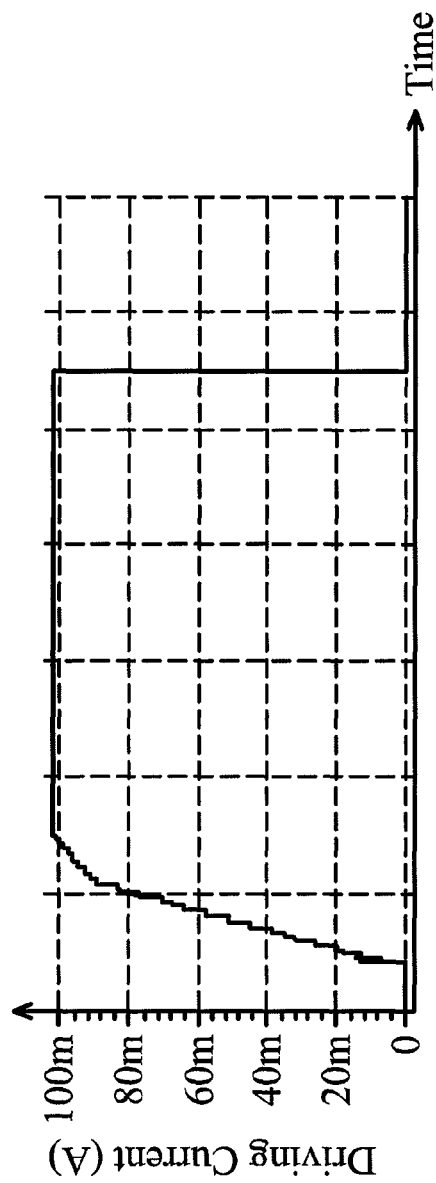
FIG. 7B is a schematic diagram of a driving current generated according to the input signals shown in FIG. 6.

Referring to FIG. 6, a schematic diagram of an embodiment of input signals of a driving circuit 100 for a voice coil motor according to the invention is shown. The input signals of the driving circuit 100 comprises a mode selection signal S0~S3, a digital input signal D0~D9, and a clock signal CLK. Referring to FIG. 7A, a schematic diagram of an analog output signal OUT generated according to the input signals shown in FIG. 6 is shown. Referring to FIG. 7B, a schematic diagram of a driving current I generated according to the input signals shown in FIG. 6 is shown. The analog output signal OUT of FIG. 7A gradually increases from 0 to 500 mV. Because the analog output signal OUT is precisely controlled by the digital output signal DO0~DO9 generated by the logic circuit 106, alteration level and timings of the analog output signal OUT is precisely controlled, preventing the analog output signal OUT from jittering. After the analog output signal OUT is converted to the driving current I shown in FIG. 7B, the driving current I comprises no jitters. The precision of the force generated by the voice coil motor 112 is therefore increased to improve the performance of the voice coil motor 112.

While the invention has been described by way of example and in terms of preferred embodiment, it is to be understood that the invention is not limited thereto. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A driving circuit for a voice coil motor, comprising:
   a clock generator, generating a control clock signal according to a mode selection signal, wherein the frequency of the control clock signal is determined by the mode selection signal;
   a logic circuit, generating a series of samples of a digital output signal according to a digital input signal, wherein the samples of the digital output signal sequentially alter from a first input value of the digital input value to a second input value of the digital input signal according to an alteration pattern determined by the mode selection signal, and the logic circuit outputs one of the samples in response to each clock cycle of the control clock signal;
   a digital-to-analog converter, converting the digital output signal to an analog output signal; and
   an output circuit, generating a driving current signal according to the analog output signal for driving the voice coil motor.

2. The driving circuit as claimed in claim 1, wherein the logic circuit operates according to a target control mode determining the alteration pattern, the target control mode is selected from a plurality of control modes of the logic circuit according to the mode selection signal, and the control mode comprises a first control mode in which the logic circuit outputs the first input value and the second input value as the samples of the digital output signal.

3. The driving circuit as claimed in claim 1, wherein the logic circuit operates according to a target control mode determining the alteration pattern, the target control mode is selected from a plurality of control modes of the logic circuit according to the mode selection signal, and the control mode comprises a second control mode in which the logic circuit outputs a plurality of values that are sequentially incremented or decremented from the first input value by one to the second input value as the samples of the digital output signal.

4. The driving circuit as claimed in claim 1, wherein the logic circuit operates according to a target control mode determining the alteration pattern, the target control mode is selected from a plurality of control modes of the logic circuit according to the mode selection signal, and the control mode comprises a third control mode in which the logic circuit outputs a plurality of values that are sequentially incremented or decremented from the first input value by $2^n$ to the second input value as the samples of the digital output signal, wherein n is a natural number gradually decreasing with the order of the samples.

5. The driving circuit as claimed in claim 1, wherein the output circuit comprises:
   an operational amplifier, having a positive input terminal for receiving the analog output signal;
   a transistor, having a gate coupled to the output terminal of the operational amplifier, a source coupled to a negative input terminal of the operational amplifier, and a drain providing the voice coil motor with the driving current signal; and
   a resistor, coupled between the negative input terminal and a ground.

6. The driving circuit as claimed in claim 1, wherein the clock generator comprises:
   an oscillator, generating a high frequency oscillating signal;
   a frequency divider, generating a plurality of clock signals with different frequencies according to the high frequency oscillating signal; and
   a multiplexer, selecting one of the clock signals as the control clock signal according to the mode selection signal.

7. The driving circuit as claimed in claim 1, wherein the driving circuit further comprises:
   an $I^2C$ module, receiving a digital serial signal, and converting the digital serial signal to the mode selection signal and the digital input signal.

8. The driving circuit as claimed in claim 7, wherein the driving circuit further comprises:
   a register, coupled between the $I^2C$ module, the clock generator, and the logic circuit, buffering the mode selection signal and the digital input signal, and delivering the mode selection signal and the digital input signal to the clock generator and the logic circuit.

9. The driving circuit as claimed in claim 1, wherein the digital input signal and the digital output signal comprises a plurality of bitstreams.

10. A method for driving a voice coil motor, comprising:
    selecting a target control mode from a plurality of control modes according to a mode selection signal;
    generating a series of samples of a digital output signal according to a digital input signal, wherein the samples of the digital output signal sequentially alter from a first input value of the digital input value to a second input value of the digital input signal according to an alteration pattern determined by the target control mode;
    converting the digital output signal to an analog output signal; and
    generating a driving current signal according to the analog output signal to drive the voice coil motor.

11. The method as claimed in claim 10, wherein the method further comprises:
    generating a control clock signal according to the mode selection signal, wherein the frequency of the control clock signal is determined by the mode selection signal; and
    triggering generation of the samples of the digital output signal according to the control clock signal.

12. The method as claimed in claim 10, wherein the control mode comprises a first control mode, a second control mode, and a third control mode, and generation of the samples of the digital output signal comprises:
    when the target control mode is the first control mode, directly outputting the first input value and the second input value as the samples of the digital output signal;

when the target control mode is the second control mode, outputting a plurality of values that are sequentially incremented or decremented from the first input value by one to the second input value as the samples of the digital output signal; and when the target control mode is the third control mode, outputting a plurality of values that are sequentially incremented or decremented from the first input value by $2^n$ to the second input value as the samples of the digital output signal, wherein n is a natural number gradually decreasing with the order of the samples.

13. The method as claimed in claim 10, wherein generation of the control clock signal comprises:

generating a plurality of clock signals with different frequencies according to a high frequency oscillating signal; and selecting one of the clock signals as the control clock signal according to the mode selection signal.

14. The method as claimed in claim 10, wherein the driving circuit further comprises:

receiving a digital serial signal according to a clock signal;

converting the digital serial signal to the mode selection signal and the digital input signal; and buffering and outputting the mode selection signal and the digital input signal.

15. The method as claimed in claim 10, wherein the digital input signal and the digital output signal comprises a plurality of bitstreams.

16. A driving circuit for a voice coil motor, comprising:

a logic circuit, generating a series of samples of a digital output signal according to a digital input signal, wherein the samples of the digital output signal sequentially alter from a first input value of the digital input value to a second input value of the digital input signal according to an alteration pattern determined by a mode selection signal;

a digital-to-analog converter, converting the digital output signal to an analog output signal; and an output circuit, generating a driving current signal according to the analog output signal for driving the voice coil motor.

17. The driving circuit as claimed in claim 16, wherein the output circuit comprises a clock generator, generating a control clock signal according to the mode selection signal, wherein the frequency of the control clock signal is determined by the mode selection signal.

18. The driving circuit as claimed in claim 17, wherein the clock generator comprises:

an oscillator, generating a high frequency oscillating signal;

a frequency divider, generating a plurality of clock signals with different frequencies according to the high frequency oscillating signal; and a multiplexer, selecting one of the clock signals as the control clock signal according to the mode selection signal.

19. The driving circuit as claimed in claim 16, wherein the logic circuit operates according to a target control mode determining the alteration pattern, the target control mode is selected from a plurality of control modes of the logic circuit according to the mode selection signal, and the control mode comprises a first control mode, a second control mode, and a third control mode, wherein in the first control mode the logic circuit outputs the first input value and the second input value as the samples of the digital output signal, in the second control mode the logic circuit outputs a plurality of values that are sequentially incremented or decremented from the first input value by one to the second input value as the samples of the digital output signal, and in the third control mode the logic circuit outputs a plurality of values that are sequentially incremented or decremented from the first input value by $2^n$ to the second input value as the samples of the digital output signal, wherein n is a natural number gradually decreasing with the order of the samples.

20. The driving circuit as claimed in claim 16, wherein the output circuit comprises:

an operational amplifier, having a positive input terminal for receiving the analog output signal;

a transistor, having a gate coupled to the output terminal of the operational amplifier, a source coupled to a negative input terminal of the operational amplifier, and a drain providing the voice coil motor with the driving current signal; and a resistor, coupled between the negative input terminal and a ground.

* * * * *